United States Patent [19]
Silva

[11] 3,841,016
[45] Oct. 15, 1974

[54] LOBSTER TRAP
[76] Inventor: Manuel F. Silva, Vineyard Haven, Martha's Vineyard, Mass.
[22] Filed: May 4, 1973
[21] Appl. No.: 357,233

[52] U.S. Cl. ................................................. 43/100
[51] Int. Cl. .......................................... A01k 69/08
[58] Field of Search ............ 43/100, 65, 58, 60, 55, 43/54.5, 56, 64, 66

[56] References Cited
UNITED STATES PATENTS
| | | | |
|---|---|---|---|
| 878,820 | 2/1908 | Murdoch | 43/100 |
| 2,731,761 | 1/1956 | Marshall | 43/100 |
| 3,176,427 | 4/1965 | Hershey | 43/100 |

Primary Examiner—Warner H. Camp

[57] ABSTRACT

A trap for lobsters and the like is shown having an elastomeric, generally toroidal body (in the form of a molded vehicle tire) with side walls spread apart, an opening through the toroidal body for the lobsters, and center closures, preferably flat plate-form members, on each side wall of the toroidal body, one being openable to remove the lobsters.

8 Claims, 5 Drawing Figures

PATENTED OCT 15 1974

LOBSTER TRAP

This invention relates to traps for lobsters and the like. Conventional traps of various designs have some or all of the defects of tending to injure the boat when hauled; being relatively expensive and bulky and requiring considerable space for storage at dockside; being subject to corrosion or other deterioration caused by salt water; being subject to erosion or destruction by seaworms; and becoming waterlogged and requiring a drying-out period so as to be light enough to handle. The present invention overcomes all of these difficulties by providing a trap comprising a vehicle balloon tire, such as a worn and discarded automobile tire, each of the normally open sides of which being provided with closures and a trap opening provided into the volume defined by the tire and closures.

Preferably: the trap opening comprises a cutout in the tread of the tire; a trapping funnel extends inwardly from the cutout and terminates in a rigid ring; a line extends from the ring across the tire to a fastening; spacers hold the side walls of the tire in permanent distended position; the spreaders are posts extending between opposite beads of the tire; bottom and top closures are flat members having openings for drainage, the bottom member secured by lashings through the substance of the tire and having weights attached; the top closure is secured at one point of its perimeter to the side wall of the tire to form a hinged connection; and a line extends from the opposite side of the hinge through the substance of the tire, tension on which keeps the top member closed upon the tire.

These and other objects of the invention will be understood from the following description of a preferred embodiment taken in conjunction with the drawings wherein.

Figure 2:
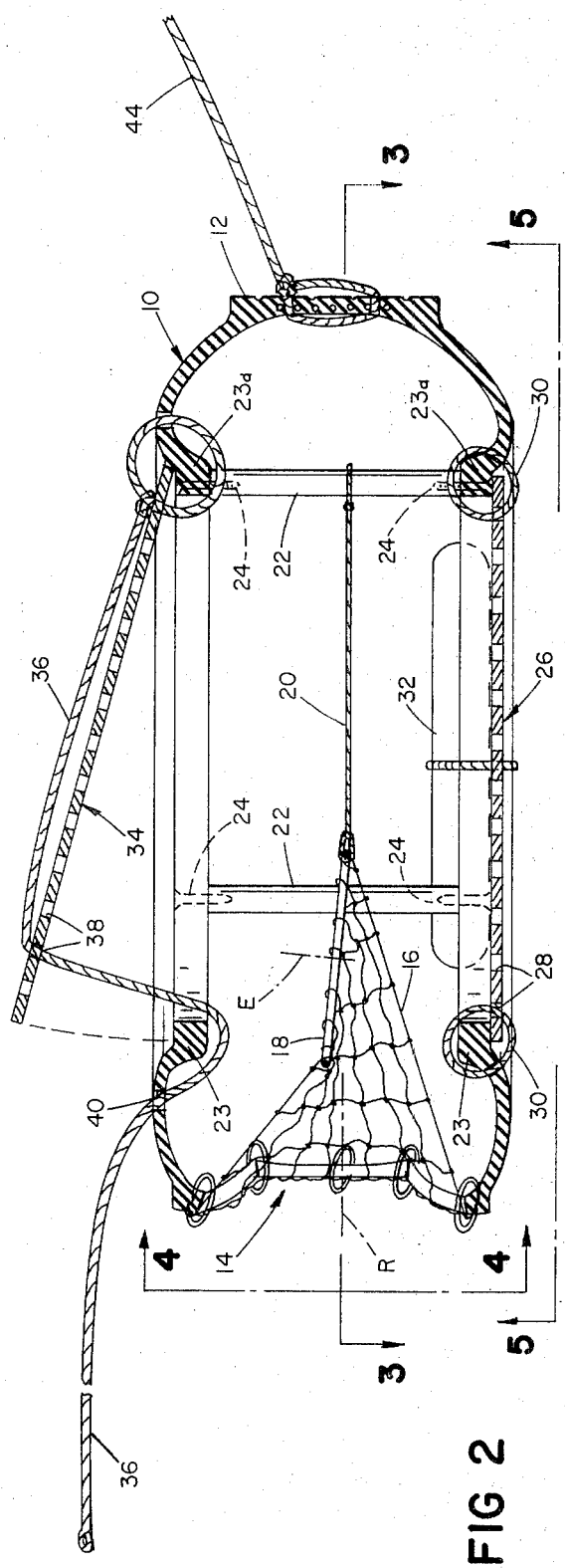
FIG. 2 is a vertical cross section of the trap of FIG. 1 taken on line 2—2 thereof.
Figure 3:
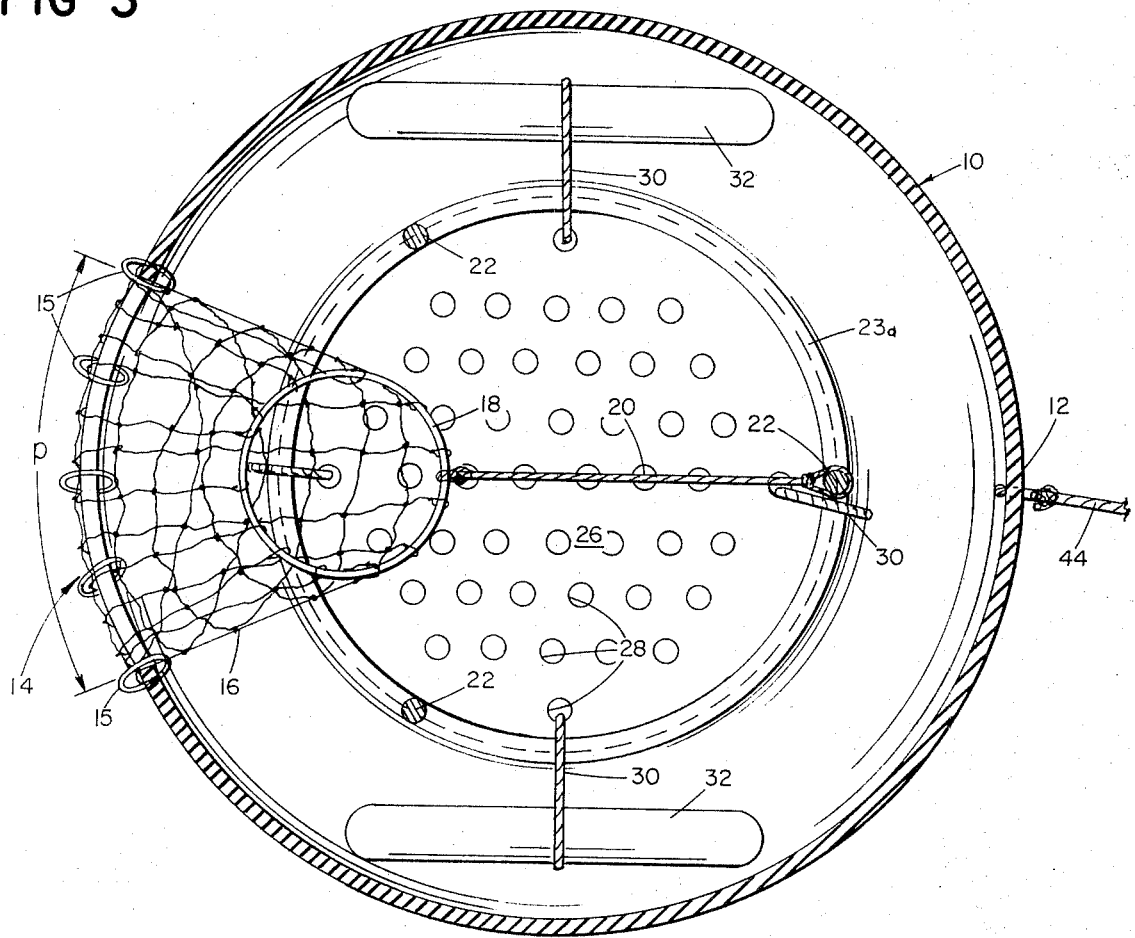
FIG. 3 is a horizontal cross section of the trap taken on line 3—3 of FIG. 2.
Figure 4:
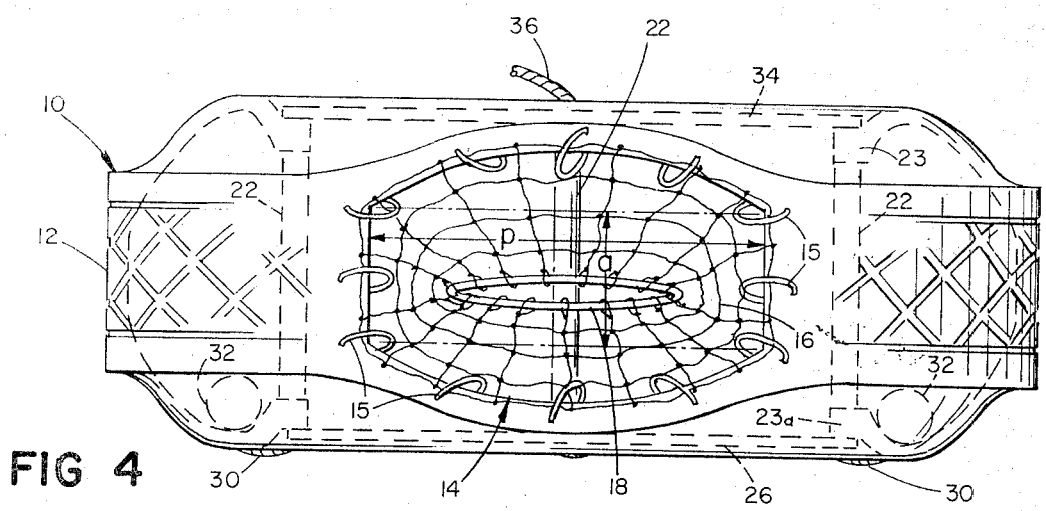
FIG. 4 is a side view of the trap taken on line 4—4 of FIG. 2.

Referring to the drawings, the preferred embodiment consists of a used automobile balloon tire 10 having a tread 12 provided with a cutout 14 having a circumferential dimension P (11 inches) longer than the dimension A parallel to the axis of the tire (before spreading by spreaders 22, 4 ½ inches). About this opening is secured a mesh funnel 16, the wide end of which corresponds in dimensions to the cutout and is secured to the substance of the tire bounding the cutout by fastenings 15, preferably metal fastening rings piercing through the substance of the funnel and the substance of the tire. As shown in FIG. 2 the funnel tapers inwardly along radial axis R, terminating in a rigid ring 18 disposed substantially horizontally, the lower portion of the funnel extending beyond the upward portion to provide continuous fabric about the ring. The ring defines an ingress to the volume of the tire from the funnel along axis E. The ring and funnel are maintained in position by line 20 extending inwardly from the ring to a fastening point.

Figure 1:
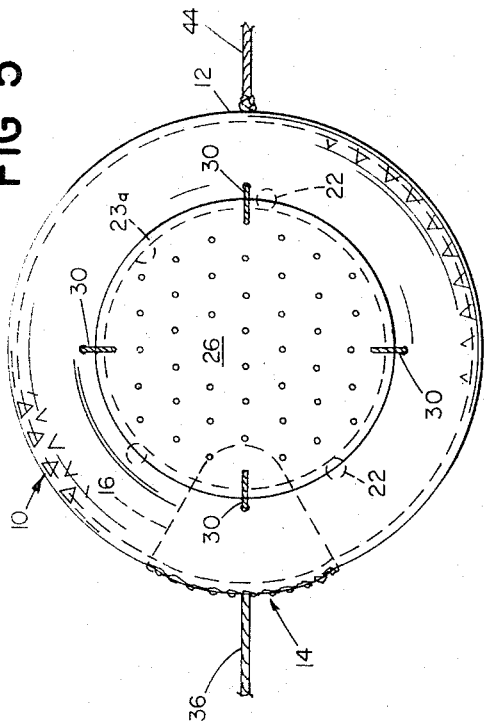
FIG. 1 is a top plan view of the trap.
Figure 5:
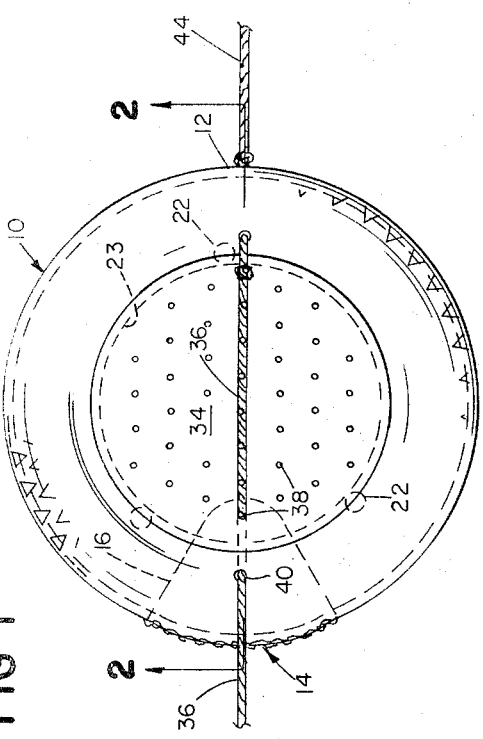
FIG. 5 is a bottom view taken along line 5—5 of FIG. 2.

The side walls of the tire are maintained in spaced-apart relationship by a series of spreader posts 22 spaced apart and extending between the upper and lower mounting beads 23 and 23a of the tire, the posts secured at their ends to the tire by fastenings 24. The line 20 holding the funnel and ring in position is secured to the spreader 22 which lies diametrically opposite from the cutout in the tread. A bottom closure for the tire 26 consists of a circular plate member, e.g., marine plywood, having a number of draining perforations 28 and secured by a series of spaced-apart lashings 30 passing through holes in the plate member and through the substance of the side wall of the tire, see FIG. 5. Within the casing of the tire 10, on its bottom side, weights 32 are secured by lashings.

The top closure 34 is similarly a circular plate with drainage openings and is secured at one point about its periphery by line 36 which passes through an opening in the top plate 34 and through the side wall of the tire, forming a hinge. The line 36 passes over top member 34 and downwardly through its opening 38, thence inwardly past the upper mounting bead 23, thence outwardly through opening 40 in the side wall of the tire, and thence to a point of securement. This line may extend to a float at the surface, serving as the line by which the trap can be hauled; however, it is preferable that a further line 44 may be secured to the substance of the tread of the tire (a portion having peripheral reinforcing elements according to conventional tire building procedures) and extends upward to a buoy for use in hauling the trap.

From the above it thus will be seen that a trap of simple, durable, and inexpensive construction is provided. The trap, being compact and with the preferred flat sides, allows for pierside stacking to be efficient. The rubber substance of the tire can withstand salt water and seaworms, it does not damage the side of the boat when it is rubbed against it during hauling, nor does it absorb water. As the rubber of the tire is denser than sea water, fewer additional weights are required to hold it on the bottom. In use it is preferable to bait the trap, although it is possible to use it without bait. Numerous variations are of course possible regarding the nature of the top and bottom closures, the weights, the funnel, etc.

What is claimed is:

1. A trap for lobsters and the like defined by a partially toroidal body member of reinforced, elastomeric substance having a generally cylindrical end wall and a pair of annular side walls integral with respective extremities of the end wall, each side wall terminating at a respective circular bead of lesser diameter than said end wall, said toroidal body member comprising a vehicle balloon tire with said end wall formed by the tread portion of the tire, spreader means for spreading the side walls apart against the resilient restoring tendency of the elastomeric substance of the body member, thereby holding said circular beads apart permitting ready communication between the volume of said generally toroidal member and the center region, and a pair of center closures, each overlying one of said beads, said pair of center closures defining with said toroidal member an effectively closed volume, a trap opening means from the exterior into said volume enabling entry but not exit of lobsters into said volume, and one of said center closures being openable to enable removal of lobsters caught in said trap.

2. The trap of claim 1 wherein said trap opening comprises a cutout in the tread portion of said tire.

3. The trap of claim 1 in which said spreader means include a plurality of spreaders distributed circumferentially about the center of the tire, holding the side walls of the tire in permanent distended position.

4. The trap of claim 3 wherein said spreaders comprise posts secured to opposite portions of the mounting beads of the tire.

5. The trap of claim 1 wherein said closures are of the form of flat members having openings for drainage of water.

6. The trap of claim 1 wherein at least one of said closures is secured to said tire by lashings extending through the substance of the corresponding side wall of the tire.

7. The trap of claim 1 wherein at least one of said closures is secured by lashing at one point of its perimeter to a side wall of the tire forming a hinged connection therewith.

8. The trap of claim 7 including a line extending from the side of said top closure opposite from said hinge, said line extending through the substance of the tire, tension on said line being effective to maintain said top closure closed upon said tire.

* * * * *